United States Patent [19]

Lauwasser

[11] Patent Number: 4,470,645
[45] Date of Patent: Sep. 11, 1984

[54] SPRING LOADED BEARING ASSEMBLY FOR ROTATING ANODE X-RAY TUBE

[75] Inventor: Albert B. Lauwasser, Skokie, Ill.

[73] Assignee: Litton Systems, Inc., Beverly Hills, Calif.

[21] Appl. No.: 516,991

[22] Filed: Jul. 25, 1983

[51] Int. Cl.³ ............................................. F16C 25/08
[52] U.S. Cl. .............................. 308/184 R; 308/189 A
[58] Field of Search .......... 308/189 A, 207 A, 184 R, 308/184 A, DIG. 11, 189 R, 207 R; 384/223

[56] References Cited

U.S. PATENT DOCUMENTS 3,759,591  9/1973  Wright et al. ................... 308/189 A
3,956,653  5/1976  Lauwasser ............................ 313/60
3,979,804  9/1976  McCormick ............... 308/DIG. 11
4,364,615  12/1982  Euler ............................... 308/189 R Primary Examiner—Lenard A. Footland
Attorney, Agent, or Firm—John M. Haurykiewicz; Walter R. Thiel

[57] ABSTRACT

A bearing mounting assembly for rotating anode X-ray tubes is disclosed having a pair of spaced apart bearings mounting a rotating shaft within a hollow bearing housing. A sleeve circumscribes the bearing housing and has shoulders engaging a spring washer to provide axial positioning and preloading of the bearings through the spring washer by means of radially disposed set screws in the sleeve engaging the bearing housing.

8 Claims, 13 Drawing Figures

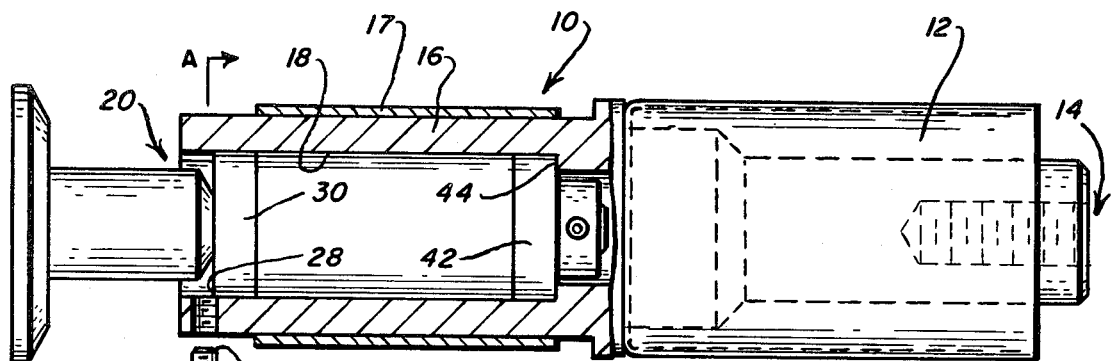
Fig_1 PRIOR ART
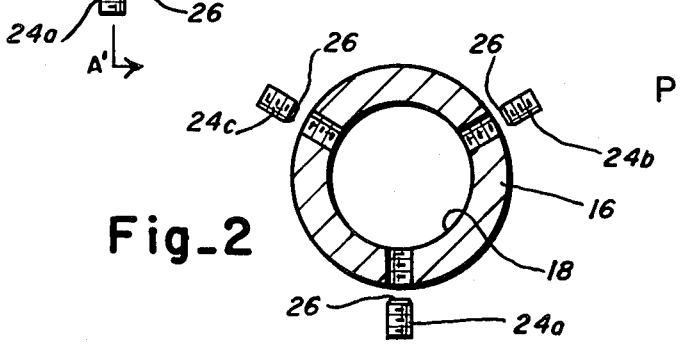
Fig_2
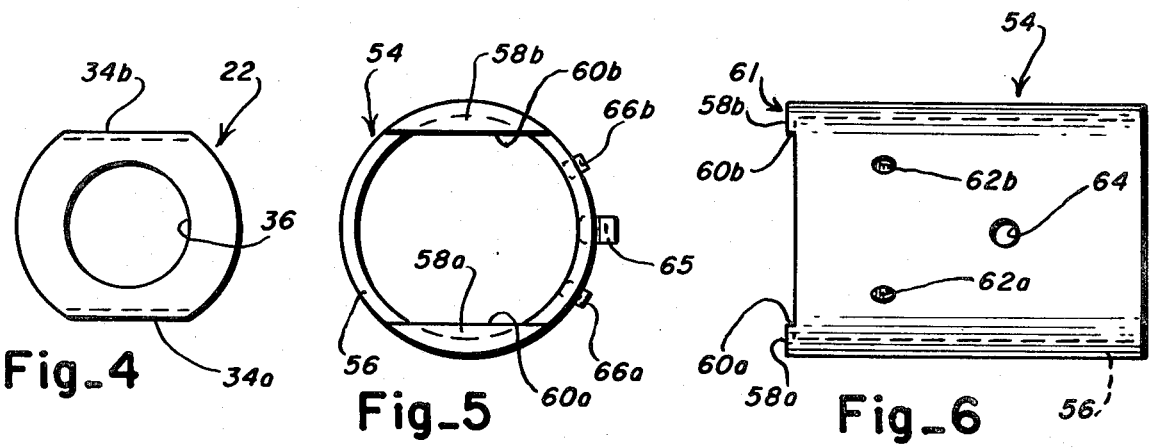
Fig_4  Fig_5  Fig_6
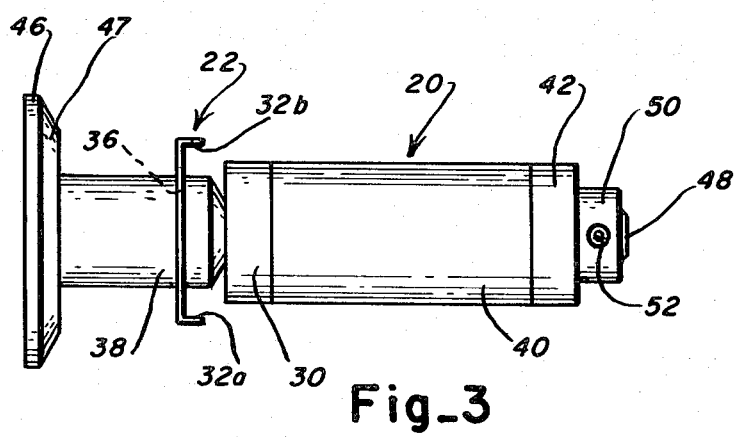
Fig_3

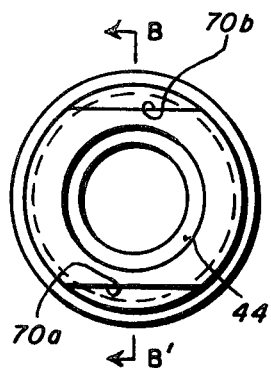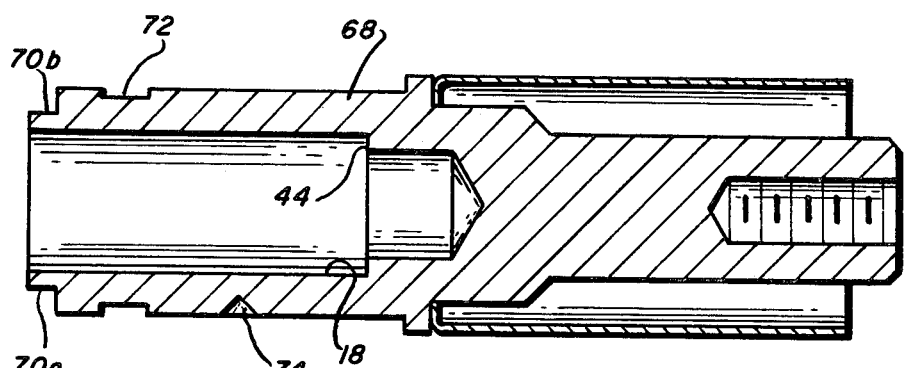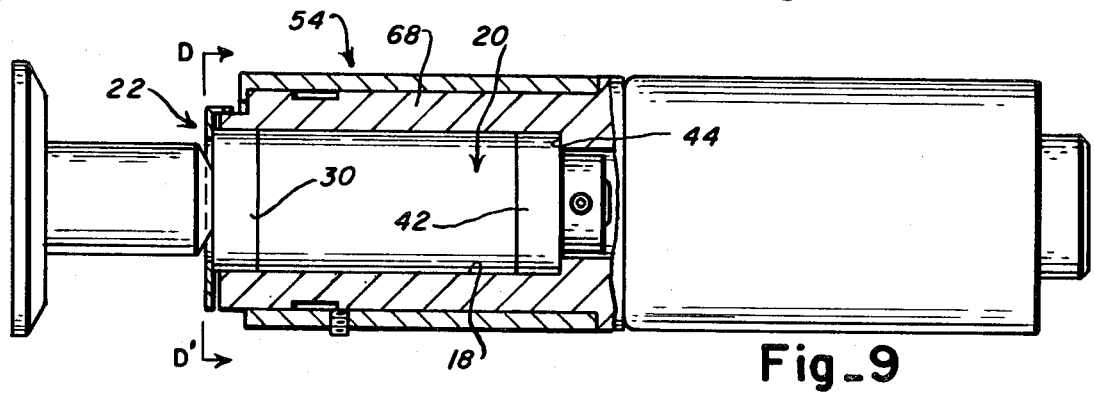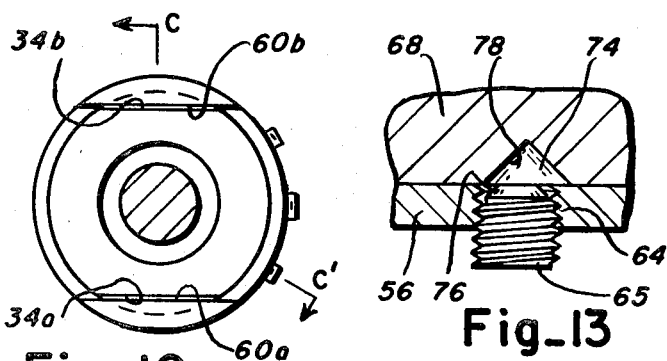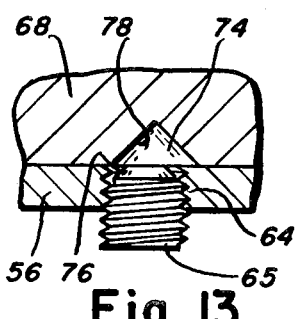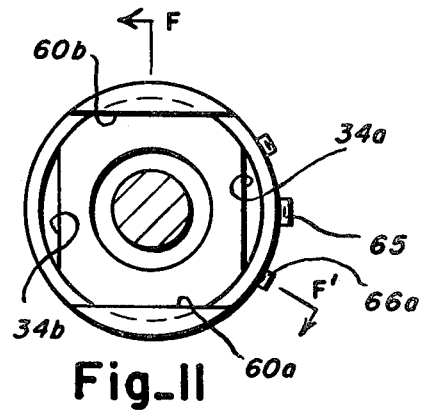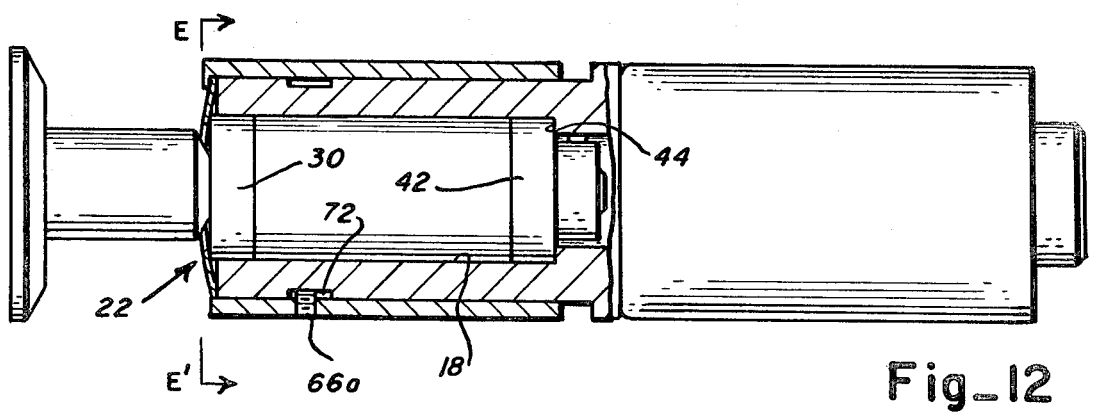

SPRING LOADED BEARING ASSEMBLY FOR ROTATING ANODE X-RAY TUBE

FIELD OF THE INVENTION

This invention relates to bearing mounting means for rotating anode X-ray tubes.

BACKGROUND OF THE INVENTION

Prior art means for securing bearings and rotating anode X-ray tubes have proven to be less than totally satisfactory. The prior art use of tapped holes containing set screws to locate and secure such bearings has resulted in contamination of the bearings by chips resulting from drilling and tapping set screw holes. Also, pressure from set screws has been found to distort bearing races with undesirable accelerated wear. Finally, the thermal cycling to which such bearing mountings are subjected can result in added wear or misadjustment.

BRIEF SUMMARY OF THE INVENTION

The present invention overcomes these shortcomings by providing a bearing mounting for rotating anode X-ray tubes which does not suffer from the above described deficiencies.

The bearing mounting of this invention includes a spring washer having locating ears disposed between an outer sleeve having shoulders retaining the washer, and a hollow bearing housing carrying the bearings for the rotating anode assembly.

BRIEF DESCRIPTION OF THE DRAWINGS

FIG. 1 discloses a prior art bearing mounting system.

FIG. 2 is a section view along A—A' of the hollow shaft of FIG. 1.

FIG. 3 is a side view of the stem shaft and bearing assembly.

FIG. 4 is a plan view of the spring washer shown in FIG. 3.

FIG. 5 is an axial end view of the outer cylinder.

FIG. 6 is a side view of the outer cylinder.

FIG. 7 is an axial end view of the hollow shaft.

FIG. 8 is a side section view B—B' of the hollow shaft of FIG. 7.

FIG. 9 is a partial section view C—C' of the outer sleeve and hollow shaft positioned for insertion of the stem and bearing assembly.

FIG. 10 is an axial end view along D—D' of FIG. 9.

FIG. 11 is a partial axial end view along section E—E' of FIG. 12.

FIG. 12 is a partial section view F—F' of the assembled and adjusted assembly.

FIG. 13 is a partial section view showing details of the drawdown setscrew structure.

DETAILED DESCRIPTION

The present invention is an improvement for mounting bearings in rotating anode X-ray tubes such as that disclosed in my U.S. Pat. No. 3,956,653, the disclosure of which is hereby expressly incorporated herein by reference.

Referring initially to FIG. 1, a prior art assembly 10 is shown for mounting a rotating anode by means of a pair of bearings for use in an X-ray tube. A flange 12 is secured to the vacuum envelope (not shown) of the tube, forming a vacuum type seal therewith. Electrical connection to the anode is made at a threaded stud 14 exterior of the vacuum envelope. The hollow sleeve 16 has a bore 18 to receive a bearing assembly 20 (as shown in FIG. 3, but without a spring washer 22). Sleeve 16 has a steel cylinder or torque sleeve 17 secured to it to enhance motor torque characteristics. Bearing assembly 20 is retained in mounting assembly 10 by means of setscrews 24a–c, positioned at 120° about the hollow sleeve 16 as shown in FIG. 2. Setscrews 24a–c are tightened until a chamfer 26 on the leading edge of setscrews 24a–c engage a corner 28 of the outer race of a ball bearing 30. The engagement of chamfer 26 with corner 28 provides axial positioning by holding bearing assembly 20 against a supporting shoulder 44 in sleeve 16. However, as stated above, this mounting technique is subject to certain deficiencies.

Referring now to FIG. 3, the present invention includes a spring washer 22 added to the bearing assembly 20. Referring to FIGS. 3 and 4, spring washer 22 is provided with a pair of ears 32a,b forming parallel sides 34a,b. Bore 36 of washer 22 is large enough to avoid interference with a stem 38. Bore 36 must, however, be less than the diameter of the outer race of bearing 30. A hollow sleeve or bearing spacer 40 is positioned between bearing 30, which is an outboard bearing, and an inboard bearing 42. The wall thickness of sleeve 40 is preferably equal to the outer bearing race thickness of bearings 30 and 42. Spacer 40 acts to transmit axial force impressed on the outer race of bearing 30 through the outer race of bearing 42 to supporting shoulder 44 (shown by way of example in FIG. 1). A flange 46, shaft 48 and stem 38 form unitary mounting means to mount the rotating anode and rotor within an X-ray tube. Anode mounting may be accomplished in any conventional manner, as for example, by securing the anode to flange 46 by setscrews engaging bevel 47. Shaft 48 is carried by the inner races of bearings 30, 42 and is secured thereto by a collar 50 which may be fastened in any conventional manner, as for example, by a setscrew 52. Referring now to FIGS. 5 and 6, an outer sleeve or collar 54 is shown. Sleeve 54 (which is preferably steel to serve the same function as torque sleeve 17) is formed of a cylindrical wall 56 and shoulders 58a,b. Sleeve 54 may be formed from a cup-shaped "blank" by milling a slot having parallel sides 60a,b in the cup end wall 61. As will be seen later, the distance between parallel sides 34a and 34b is less than the distance between parallel sides 60a and 60b, permitting passage of washer 22 between surfaces 60a,b when the parallel sides of spring washer 22 and sleeve 54 are aligned. Shoulders 58a,b are sized to prevent passage of washer 22 through the end wall 61 of sleeve 54 when the respective parallel sides of the washer 22 and end wall 61 are not aligned (as will be described in more detail below). Sleeve 54 further has three threaded holes, the first two of which, 62a,b receive locking setscrews 66a,b while the third 64, receives a drawdown setscrew 65, shown in detail in FIG. 13.

Referring now to FIGS. 7 and 8, a cylindrical bearing housing or support 68 (which corresponds to sleeve 16 of FIG. 1) has exterior shoulders 70a,b groove 72, and a chamfered blind hole 74. Inner bore 18 and shoulder 44 are as shown in FIG. 1.

Referring now to FIG. 9, to assemble this bearing mounting structure, outer sleeve 54 is first placed over bearing housing 68. Bearing assembly 20 carrying spring washer 22 is then inserted into bore 18 until bearing 42 rests against shoulder 44. Ears 32a,b of washer 22 are received on shoulders 70a,b and surfaces 34a,b are aligned with sides 60a,b as shown in FIG. 10.

Outer sleeve 54 is then moved axially until shoulders 58a,b move past spring washer 22. Bearing housing 68 is then rotated 90° to bring blind hole 74 into radial alignment with threaded hole 64. The alignment of parts is now as shown in FIGS. 11 and 13. Threaded hole 64 and blind hole 74 are axially slightly offset (as shown in FIG. 13) to cause deformation of spring 22 (as shown in FIG. 12) as drawdown setscrew 65 is threaded into hole 64 and engages blind hole 74. Axial displacement is produced as bevel 76 on setscrew 65 progressively engages chamfer 78 on blind hole 74. Once the desired axial force is obtained (which may be determined by the axial displacement or deflection of spring 22), locking setscrews 66a,b are tightened, engaging bearing housing 68 in groove 72. By engaging housing 68 in groove 72, any burrs raised by such engagement of the locking setscrews 66a,b are below the mating surfaces of housing 68 and sleeve 54, and thus will not interfere with later disassembly or reassembly.

The invention is not to be taken as limited to all of the details thereof as modifications and variations thereof may be made without departing from the spirit or scope of the invention.

Accordingly what I claim is:

1. In a bearing mounting assembly for supporting a rotating anode in an X-ray tube, the assembly having a rotating shaft and flange for mounting an anode; a stationary bearing housing secured to the tube envelope; and a pair of spaced-apart ball bearings to allow relative rotation of the shaft with respect to the stationary bearing housing, the improvement comprising:
   (a) an outer sleeve having a plurality of radially inwardly projecting shoulders at one end thereof;
   (b) a spring washer having:
      (i) an outer diameter sufficient to engage said shoulders, and
      (ii) a plurality of reduced diameter portions corresponding in location and shape to said shoulders such that:
      (i) said washer will pass through said outer sleeve when said reduced diameter portions are aligned with said shoulders, and
      (ii) said washer will be retained by said outer sleeve when said shoulders engage said outer diameter of said washer; and
   (c) means connecting said outer sleeve and said bearing housing for axially driving said washer against one of said bearings to locate and secure said one bearing.

2. The improvement of claim 1 wherein said washer further comprises a generally planar disk.

3. The improvement of claim 2 wherein said washer further comprises at least one ear projecting out of the plane of the disk and wherein said bearing housing further comprises a surface adapted to receive said ear to prevent said washer from rotating when said housing and said outer sleeves are rotated relative to each other.

4. The improvement of claim 2 wherein said washer further comprises at least one projection extending out of the plane of the disk and wherein said bearing housing further comprises a surface adapted to receive said projection to prevent said washer from rotating in response to drag from said one bearing during operation.

5. An improved bearing mounting assembly for use in rotating anode type X-ray tubes of the type having a rotatable shaft for mounting an anode, first and second ball bearings mounted on said shaft, a stationary bearing support secured to the tube envelope and adapted to receive said shaft with said bearings mounted thereon, the improvement comprising in combination therewith:
   (a) a collar having:
      (i) a generally hollow cylinder portion,
      (ii) two diametrically opposed and radially inwardly directed shoulder portions at one end thereof having a first distance between said shoulders less than the inner diameter of said hollow cylinder portion, and
      (iii) a threaded fastener projectable radially inward of said hollow cylinder portion;
   (b) a resilient washer having:
      (i) an aperture with a diameter less than the diameter of the outer race of said first ball bearing,
      (ii) an outer diameter greater than said first distance, and
      (iii) two reduced diameter portions diametrically opposed on the periphery of said washer such that the distance therebetween is less than said first distance;
   (c) A tapered surface on the exterior of said stationary bearing support adapted to receive said threaded fastener so that said washer is resiliently deformed between said shoulders and said first ball bearing as said threaded fastener progressively engages said tapered surface.

6. The combination of claim 5 wherein said tapered surface comprises a chamfered blind hole.

7. The combination of claim 5 further comprising a second threaded fastener projectable radially inward of said cylinder portion of said collar and engageable with said bearing support to prevent relative axial motion between said outer sleeve and said stationary bearing support sleeve.

8. The combination of claim 7 wherein said bearing support further comprises a reduced diameter region adapted to receive engagement of said second threaded fastener.

* * * * *